United States Patent [19]

Fehr et al.

[11] Patent Number: 4,717,246
[45] Date of Patent: Jan. 5, 1988

[54] MICROSCOPE WITH MOVABLE BINOCULAR TUBE

[75] Inventors: Erwin Fehr, Heerbrugg; Andreas Schaefer, Belgach, both of Switzerland

[73] Assignee: Wild Heerbrugg AG, Heerbrugg, Switzerland

[21] Appl. No.: 749,275

[22] Filed: Jun. 27, 1985

[30] Foreign Application Priority Data

Jun. 29, 1984 [CH] Switzerland .................. 3157/84

[51] Int. Cl.⁴ .................. G02B 21/20; G02B 7/02
[52] U.S. Cl. .................. 350/516; 350/520
[58] Field of Search .................. 350/507, 511–520, 350/522, 570

[56] References Cited

U.S. PATENT DOCUMENTS

| | | | |
|---|---|---|---|
| 1,818,974 | 8/1931 | Engelmann | 350/520 |
| 1,853,674 | 4/1932 | Engelmann | 350/514 |
| 3,994,558 | 11/1976 | Schulz et al. | 350/520 |
| 4,217,025 | 8/1980 | Takenaka . | |
| 4,492,441 | 1/1985 | Hopkins | 350/516 |

FOREIGN PATENT DOCUMENTS

| | | |
|---|---|---|
| 2525798 | 1/1978 | Fed. Rep. of Germany . |
| 3229516 | 2/1984 | Fed. Rep. of Germany . |
| 3318011 | 11/1984 | Fed. Rep. of Germany . |

*Primary Examiner*—William H. Punter
*Attorney, Agent, or Firm*—Helfgott & Karas

[57] ABSTRACT

A microscope includes a stand with an upright. A generally L-shaped motion box is movable along the upright. A vertical portion of the motion box surrounds the upright, while its horizontal section provides a support for the microscope optical system. An objective is fixed to the bottom of the support. The top of the support includes a guide for an optical support carrying a binocular tube. The optical support and the binocular tube of the microscope are displaceable or movable relative to the fixed objective. With this microscope, the same point on an object can be observed with the same image quality, despite whether the object point is observed in a stereoscopic, monocular or binocular manner.

9 Claims, 8 Drawing Figures

MICROSCOPE WITH MOVABLE BINOCULAR TUBE

FIELD OF THE INVENTION

The present invention relates to a microscope with a relatively movable binocular tube and a fixed objective.

BACKGROUND OF THE INVENTION

A microscope with a binocular tube is described in German Pat. No. 35 35 798 (WILD AG). The main objective of this microscope can be displaced until the optical axis of the objective coincides with the optical axis of one of the subsystems of the two optical system. Thus, the image quality in this subsystem is considerably improved.

However, the displacement of the objective disadvantageously results in the same object point being no longer imaged. In addition, the optical axis of objective and transillumination no longer coincide. Thus, a correcting movement is required to displace the observed object and optionally the illuminating device or even the complete microscope, including the objective.

SUMMARY OF THE INVENTION

An object of the present invention involves providing a microscope wherein one of the ocular optical axes of the binocular tube can be moved to a position wherein one ocular optical axis coincides with the objective optical axis without affecting the object point being imaged or the illumination.

Another object of the present invention is to provide a microscope with a binocular tube movable for stereoscopic, monocular or binocular observation which can be simply and quickly adjusted to the desired type of observation.

The foregoing objects can be obtained by a microscope comprising a binocular tube, oculars in the binocular tube defining parallel ocular optical axis, and a fixedly mounted microscope objective defining a fixed objective optical axis. The binocular tube is movable relative to the fixed objective in a manner maintaining the ocular and objective optical axis parallel during the movement.

By moving the binocular tube, rather than the objective, the object point being imaged is not changed, eliminating the requirement for a correcting movement. Additionally, the relative positions of the objective and illumination axes are not changed such that re-adjustment is not required.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE PREFERRED EMBODIMENTS

Figure 1:
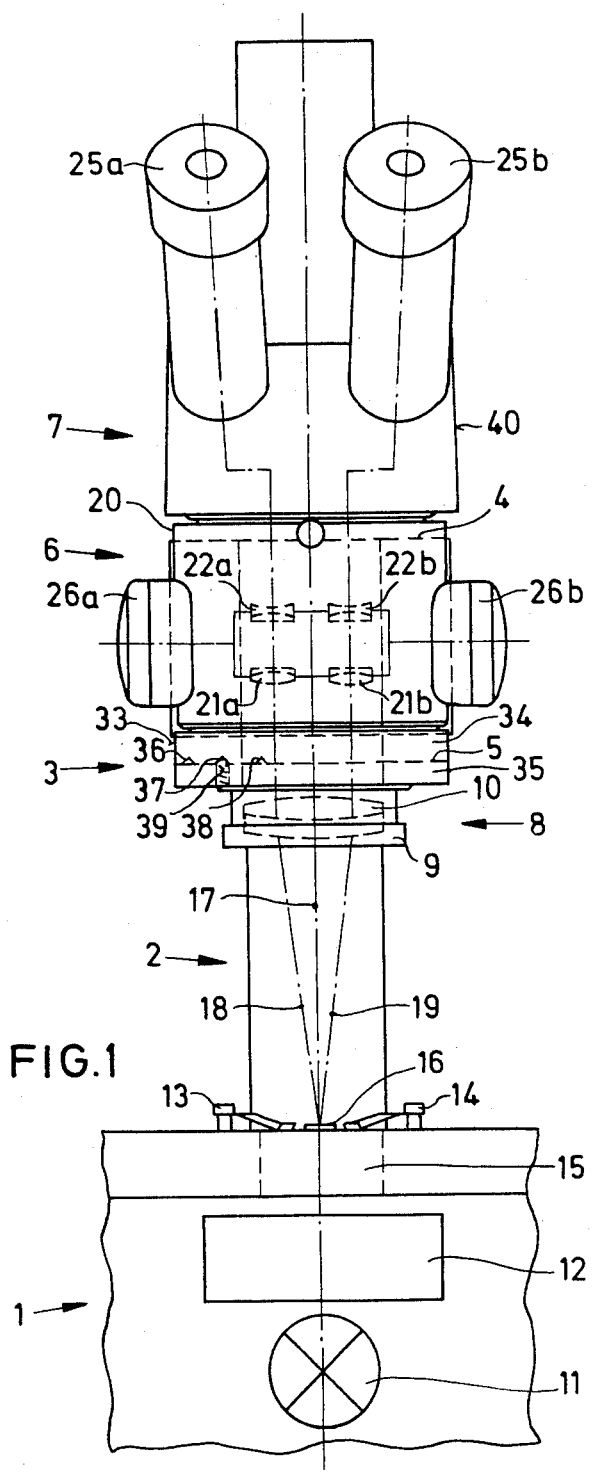
FIG. 1 is a front elevational view of a microscope according to a first embodiment of the present invention.

The microscope illustrated in FIG. 1 has a stand 1, constructed as a transilluminating stand. Since transilluminating strands are generally known, it is not described or illustrated in detail. Stand 1 comprises a vertical upright 2. A generally L-shaped motion box 3 is vertically movable on upright 2. The vertically directed part 4 of the motion box is hollow and surrounds the upright 2. Part 4 of motion box 3 houses conventional means for adjusting the motion box 3 along upright 2 including a control elementor knob 30 (see FIG. 8). The horizontal leg 5 of motion box 3 supports an optical support 6 positioned slightly higher than vertical part 4 of motion box 3. This optical support 6 carries a binocular tube 7. The bottom of the horizontal leg 5 serves as a support for the remaining optical parts 6 and 7 of the microscope, and is provided with an objective 8. Objective 8 includes a barrel containing the objective lens or the objective lenses 10.

An illuminating means or device comprising a bulb 11 and a condenser 12 is diagrammatically shown within the transilluminating stand 1. Object clips 13 and 14 are provided on top of stand 1 and have end portions pivotable into the vicinity of an opening 15 formed in stand 1. An object 16 to be observed with the microscope is placed over opening 15 and in the optical axis 17 of the system.

The top of horizontal support 5 is provided with a shoulder 31 (FIG. 8) extending up to the end of support 5. The free end portion of support 5 forms a tongue 32 having an angle piece 33 with the horizontal leg 34 of angle piece 33 resting on the top of tongue 32. The vertical leg 35 of angle piece 33 rests on the end face of the free end portion of tongue 32 and is fixed in this position by screws 62.

The optical paths of the twin optical system are designated 18a and 18b. Optical support 6 has a substantially cylindrical casing 20 in which lenses 21a, 21b, 22a, 22b (FIG. 2) of a magnification changer/focuser and tube lens system and in which image erecting prisms 23a and 23b are located. The erecting prisms are followed by the intermediate image planes 24a and 24b, and eyepieces 25a and 25b. The optical elements are operated by operating knobs 26a and 26b. In the drawings, portions of the left-hand optical system or viewing channel include the designation "a", while the portions of the right-hand optical system or viewing channel include the designation "b".

Figure 8:
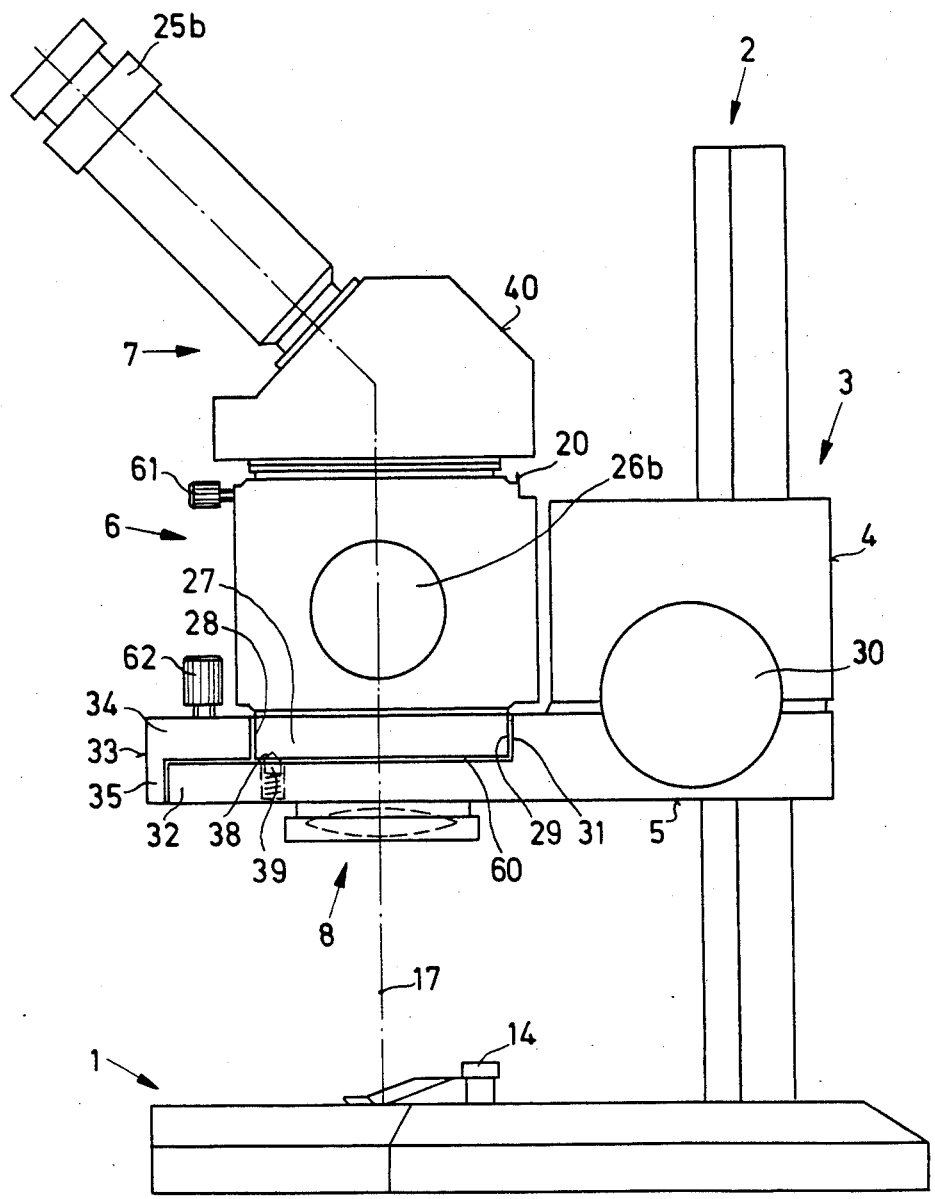
FIG. 8 is a side elevational view of the microscope of FIG. 1.

The base surface of casing 20 is connected to a substantially square attachment 27 (FIG. 8). The front and rear side faces 28 and 29 of attachment 27 are guided along the top surface of tongue 32 in the recess between the free end face of angle piece 33 and the side wall of shoulder 31. This arrangement enables optical support 6 to be moved by rotation of screw 61 from its central position to the left or right relative to the optical axis 17 of the complete optical system by a specific amount. If necessary, the optical support can be removed from motion box 3.

A locking device is provided in horizontal leg 5 for the individual positions of the optical support 6 within its guided path. As shown in FIG. 1, the locking device includes linearly juxtaposed depressions 36, 37 and 38 in the bottom surface of attachment 27, and a spring-biased ppin 39, which is inserted in tongue 32 of horizontal leg 5. The displacement of tube 7 and support 6 relative to objective 8 [or to axis 17 thereof] is effected by manual movement, faces 28 and 29 of attachment 27 being guided between the free end face of angle piece 33 and the side wall of shoulder 31. The tip of pin 39 projects from the surface of tongue 32 and can be received in one of the depressions 36 to 38 keeping optical support 6 in a given position with respect to objective 8.

Eyepieces 25a, 25b ar fixed to casing 40 of binocular tube 7, while the image erecting prisms 23a, 23b are located in casing 40. Since binocular tube 7 is positioned on optical support 6, binocular tube 7 is also laterally displaceable with respect to optical axis 17.

Figure 2:
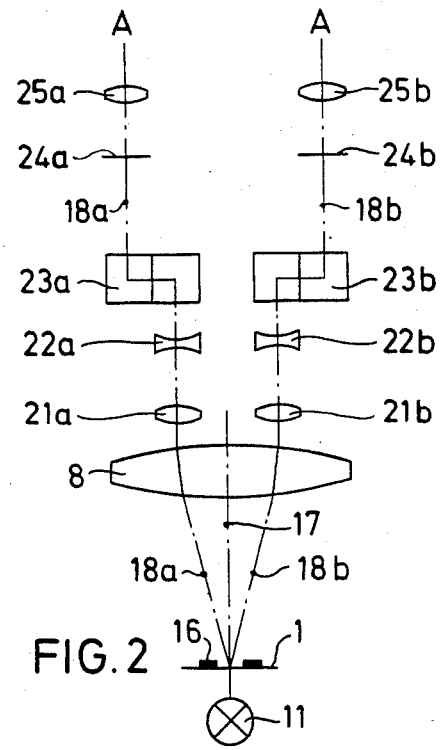
FIG. 2 is a diagrammatic illustration of the optical path in the microscope of FIG. 1, when the microscope twin optical system is located in its central position.

FIG. 2 shows the optical support 6, containing lenses 21a, 21b, 22a, and 22b, in a central position or symmetrical position with respect to system axis 17. The spring-biased pin 39 of the locking device is engaged in central depression 37. Stereoscopic observations of object 16 are possible in this position of optical support 6.

If axial imaging of object 16 is required, optical support 6 and binocular tube 7 are laterally displaced until the optical axis of one subsystem a or b of the twin optical system coincides with objective axis 17. The laterally displaced positions are determined by recesses 36 and 38 in attachment 27 so that the displacement of optics 6 and 7 from the previous position to another position can take place rapidly in an acurate and easily reproducible manner.

Figure 3:
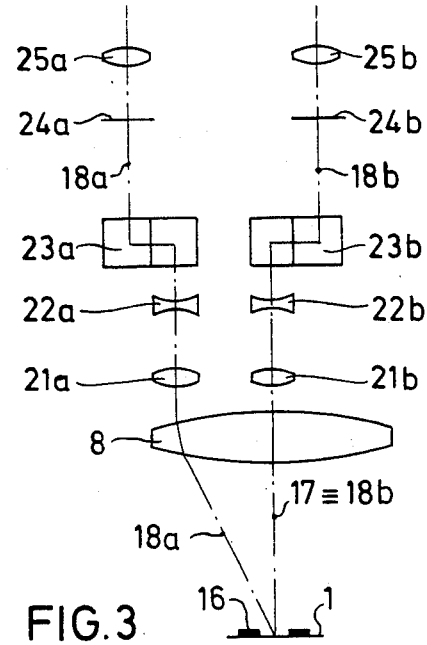
FIG. 3 is a diagrammatic illustration of the optical path in the microscope of FIG. 1 when its twin optical system is in one of its lateral positions.

FIG. 3 diagrammatically shows one of the laterally displaced positions of optical support 6 and binocular tube 7. Microscope parts 6 and 7 are displaced to the left so that the optical axis of the right-hand twin system b coincides with the axis 17 of objective 8. One of the most important advantages of this displacement of optical support 6 and binocular tube 7 with respect to the fixed objective 8 is that, independently of the positioon of microscope parts 6 and 7, objective 8 always images the same point on object 16.

Figure 6:
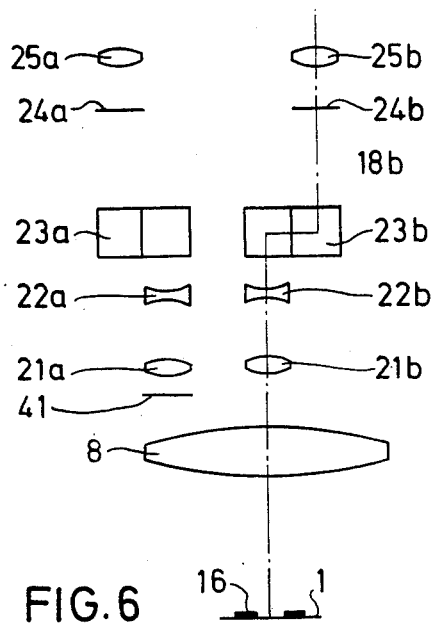
FIG. 6 is a diagrammatic illustration of the optical path in the microscope of FIG. 4.

The quality of the imaging of an object by an objective is always greatest in the center of the objective. This quality decreases towards the edges of the objective. When moving microscope parts 6 and 7 into one of their end or laterally displaced positions, the quality of the image produced by the subsystem of the twin optical system associated with the edge of objective 8 is low. When simultaneously observing images of object 6 provided by the two subsystems a and b, the poorer quality image could disturb the observation of the excellent quality image. This disadvantage is obviated by the microscope according to the embodiment shown in FIGS. 4 to 6.

Figure 4:
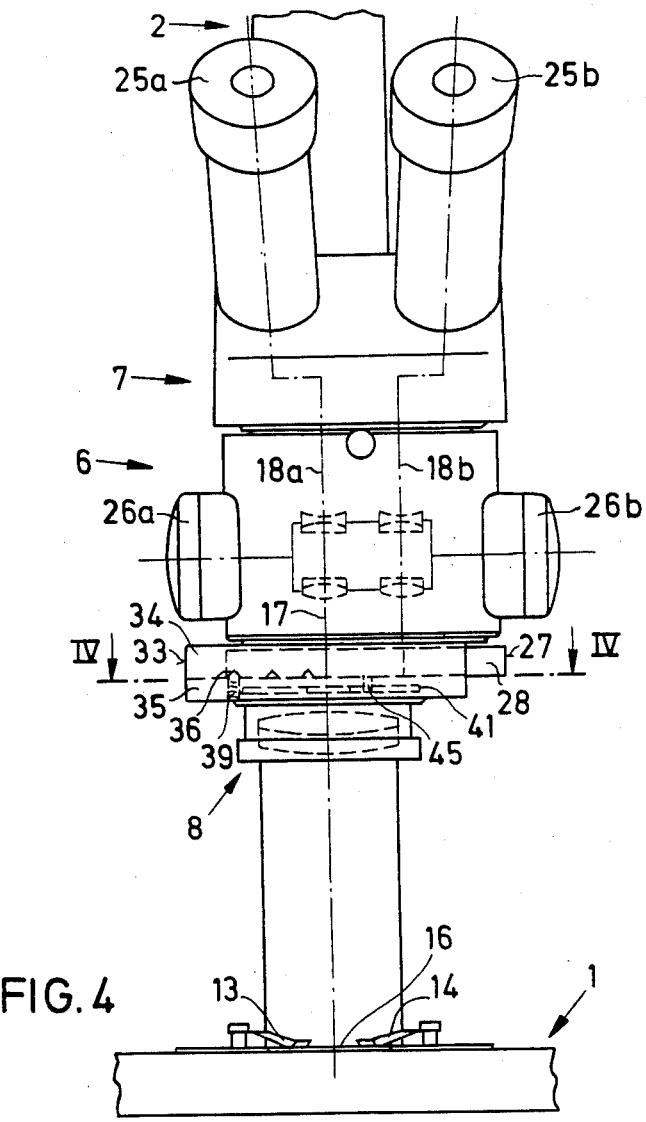
FIG. 4 is a front elevational view of the microscope of FIG. 1 when its twin optical system is in one of its lateral positions.

The microscope shown in FIG. 4 differs from that of FIG. 1 by the presence of a diaphragm 41 in the optical path of the particular half a or b of the twin optical system associated with the edge of objective 8 when microscope parts 6 and 7 are located in one of their lateral positions. As illustrated in FIG. 4, microscope stand 1 is constructed as a plate on which object 16 is arranged in the vicinity of object clips 13 and 14. Object 16 can be illuminated with incident light. Microscope parts 6 and 7 are displaced to the right in FIG. 4 so that the tip of pin 39 in motion box 3 engages the left-hand depression 36 of optical support 6. Axis 18a of the left-hand half or subsystem a of the twin optical system coincides with objective axis 17. The other half or subsystem b of the twin optical system faces the edge portion of objective 8 and receives a reduced quality image. Diaphragm 41 insures that the reduced quality image does not pass to the laterally positioned eyepiece 25b.

Figure 5:
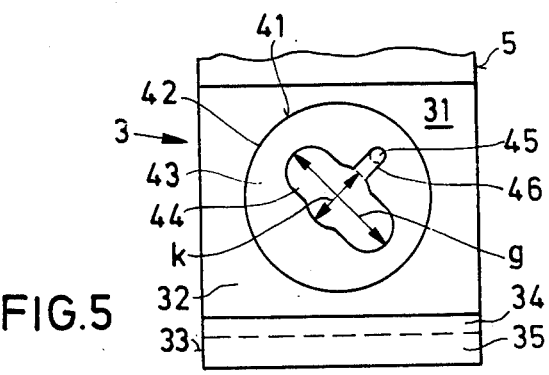
FIG. 5 is a top plan view in section taken along lines IV—IV of FIG. 4, illustrating a diaphragm in the microscope.

Diaphragm 41 is shown in FIG. 5. In the top of tongue 32 adjacent shoulder 31, a disk-like recess 42 is formed and rotatably mounts a disk 43. Disk 43 is made from on opaque material, and has an elongated, roughly kidney-shaped opening in its central region 44. The bottom of attachment 27, with the front side wall 28 being partly visible in FIG. 4, is provided with a downwardly directed stud 45. Stud 45 is located in a second opening in disk 43. In FIG. 5, second opening 46 is connected to first opening 44 in diaphragm 41 and is in the form of an elongated hole. Second opening 46 is spaced from the center of disk 43 such that disk 43 can rotate in recess 42 when optical support 6 is laterally displaced with respect to the fixed motion box 3. This rotation of disk 43 occurs automatically by the interaction of stud 45 and second opening 46.

When optical support 6 is in its central position, i.e., when objective axis 17 is located between ocular optical axes 18a and 18b, the larger dimension g of the elongated and roughly elliptical opening 44 in disk 43 extends horizontally as viewed in FIG. 5. In this position there is a visual connection between the two subsystems a and b and objective 8. The light beams of the left-hand subsystem pass through the left-hand half of opening 44, while the light beams of the right-hand subsystem b pass through the right-hand half of opening 44 in disk 43. In this position of disk 43, stud 45 is located above opening 44 and substantially in the center of the greater length g thereof. In addition, stud 45 is located in the lower region of elongated hole 46.

If optical support 6 is displaced to the right, then stud 45 is displaced to the right therewith. Due to the engagement of stud 45 in elongated hole 46 in disk 43, disk 43 rotates about its center in recess 42. Opaque portions of disk 43 pass into the vicinity of the previous optical paths a and b, which paths were previously located outside of the center of objective 8, and consequently outside of the center of disk 43. Since opening 44 in disk 43 has a certain width k, there is always an opening in the center of disk 43, independently of the rotational position of the disk. On laterally displacing the optical support 6, the optical axis of one of the subsystems, in the present case the left-hand subsystem a, passes through the central area of disk 43 and consequently into the center area of objective 8 providing a visual connection between subsystem a and objective 8. The other subsystem b and objective 8 are separated by one of the opaque portions of the disk-shaped diaphragm 41. Thus, the poorer image quality portion does not pass into this subsystem b. This situation is diagrammatically shown in FIG. 6, although it represents the alternative case in which diaphragm 41 blocks the path between the left-hand subsystem a and objective 8.

Figure 7:
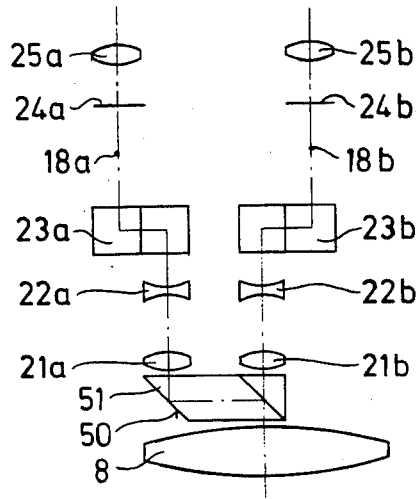
FIG. 7 is a diagrammatic illustrative of the optical path in the microscope of FIG. 1, in which an inclination prism is connected downstream of the objective.

Binocular observation of object 16 can be provided through the vertical optical path of the high image quality with a known beam splitter 50 inserted in the path of the optical beams, as indicated in FIG. 7. Part of the beam passing through the center of objective 8 is deflected by an inclination prism 51 present in beam splitter 50 int the left-hand subsystem a so that the image appears in the left-hand eyepiece 25a in the same way as in the right-hand eyepiece 25b.

The microscope of the present invention is simply constructed. It can be inexpensively manufactured and easily operated. The same image point can be observed in a stereoscopic, binocular or monocular manner with an increased image quality. With the aid of the present microscope, it is possible to produce stereo image pairs with a random stereo basis. Either the left or right-hand optical subsystem can be positioned over the center of objective 8 to adapt the microscope to the individual wishes of the microscope user. The user can use either the left or right eye for fucusing during photography, or for setting or reading a measuring mark on the object. Diaphragm 41 can interrupt the optical path located outside of the objective center so that the image having a reduced quality cannot pass into the eye of the microscope user during binocular observation of the object. Diaphragm 41 is automatically operated or positioned by the movable microscope parts 6 and 7.

While various embodiments have been chosen to illustrate the invention, it will be understood by those skilled in the art that various changes and modifications can be made therein without departing from the scope of the invention as defined in the appended claims.

What is claimed is:

1. A microscope comprising:
   a binocular tube;
   an optical support, said tube being fixed to said support;
   oculars in said tube defining parallel first and second ocular optical axes;
   a fixedly mounted microscope objective defining a fixed objective optical axis;
   displacement means for moving said tube and said support relative to said objective and for maintaining the ocular and objective axes parallel during movement of the tube and support, said displacement means moving the tube and support between a first position in which the ocular optical axes are essentially equally spaced from the objective ocular axis and a second position in which one of said ocular optical axes is essentially coaxially aligned with the objective optical axis; and
   means for selectively preventing passage of light from the objective to the support and tube along the other ocular optical axis when said one optical axis is coaxially aligned with the objective optical axis.

2. A microscope according to claim 1 wherein said support is mounted on a motion box having a first portion surrounding a microscope upright and having a second portion coupled to said first portion and being a flat tongue, said portion having guide means for controlling movement of said binocular tube.

3. A microscope according to claim 2 wherein said second portion of said motion box comprises a recess extending across a longitudinal axis of said second portion, an attachment on a bottom portion of said optical support located in a guided by said recess.

4. A microscope according to claim 3 wherein locking means, coupled to said optical support and said second portion of said motion box, releasably secures said optical support to said second portion.

5. A microscope according to claim 4 wheren said locking means comprises a spring biased pin mounted in said second portion of said motion box and depressions in said attachment at points corresponding to desired locked positions of said optical support.

6. A microscope according to claim 1 wherein a lens system in said binocular tube juxtaposes light beams therein in parallel.

7. A microscope according to claim 1 wherein said objective is mounted on an object support stand, said stand comprising an illumination device fixedly mounted in said stand, said binocular tube being movable relative to said illumination device.

8. A microscope comprising:
   a binocular tube;
   an optical support upon which said tube is mounted, said support having a bottom portion with an attachment;
   oculars in said tube defining parallel first and second ocular optical axes;
   a fixedly mounted microscope objective defining a fixed objective optical axis;
   displacement means for moving said tube relative to said objective and for maintaining said ocular and objective optical axes parallel during movement of said tube; and
   a motion box upon which said support is mounted, said box having a first portion surrounding a microscope upright and having a second portion coupled to said first portion and being a flat tongue, said second portion having guide means for controlling movement of said tube, said second portion of the motion box comprising a recess extending across a longitudinal axis of the second portion, said attachment being located in and being guided by said recess, said second portion also comprising diaphragm means for selectively blocking one of said ocular optical axes.

9. A microscope according to claim 8 wherein said diaphragm means comprises a disk with an elongated opening rotatably mounted in a second recess in said second portion of said motion box, said second recess being adjacent and below said first recess, said opening having a width permitting unimpeded passage of light beams from said objective, said disk engaging a stud fixed to said optical support.

* * * * *